US011238319B2

(12) United States Patent
Pfeifle et al.

(10) Patent No.: US 11,238,319 B2
(45) Date of Patent: *Feb. 1, 2022

(54) METHOD AND CONTROL UNIT FOR DETECTING A REGION OF INTEREST

(71) Applicant: Visteon Global Technologies, Inc., Van Buren Township, MI (US)

(72) Inventors: Martin Pfeifle, Seewald (DE); Niclas Zeller, Oberschleissheim (DE); Markus Mainberger, Ludwigsburg (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 131 days.

This patent is subject to a terminal disclaimer.

(21) Appl. No.: 16/819,087

(22) Filed: Mar. 14, 2020

(65) Prior Publication Data

US 2020/0293815 A1    Sep. 17, 2020

(30) Foreign Application Priority Data

Mar. 14, 2019   (EP) .................................... 19162875

(51) Int. Cl.
*G06K 9/62*     (2006.01)
*G06K 9/00*     (2006.01)
(Continued)

(52) U.S. Cl.
CPC ......... *G06K 9/628* (2013.01); *G06K 9/00805* (2013.01); *G06K 9/00818* (2013.01);
(Continued)

(58) Field of Classification Search
CPC ............... G06K 9/628; G06K 9/00805; G06K 9/00818; G06K 9/00597; G06K 9/4628;
(Continued)

(56) References Cited

U.S. PATENT DOCUMENTS 9,720,412 B1 *   8/2017   Zhu ...................... G05D 1/0246
10,210,672 B2 *  2/2019   James ................... H04L 67/025
(Continued)

FOREIGN PATENT DOCUMENTS

EP          3748533 A4 *   5/2021   ........... G06K 9/3275

OTHER PUBLICATIONS

Palazzi, A., et al. Predicting the Driver's Focus of Attention: the DR(eye)VE Project, Jun. 6, 2018, 25 pages, Ithaca, NY.
(Continued)

*Primary Examiner* — Mahendra R Patel
(74) *Attorney, Agent, or Firm* — Quinn IP Law

(57) ABSTRACT

A method for a vehicle includes determining a region of interest based on environment sensor data corresponding an environment of the vehicle and a machine-learned predictor configured to identify, within the environment sensor data, a region as the region of interest that at least statistically coincides with a line of sight of an occupant of the vehicle. The method also includes classifying a detected object within the determined region of interest using an object detection algorithm. The method also includes operating the vehicle in based on at least one of the detected object and the determined region of interest.

17 Claims, 3 Drawing Sheets

(51) Int. Cl.
*G06N 3/08* (2006.01)
*G05D 1/00* (2006.01)
*G05D 1/02* (2020.01)

(52) U.S. Cl.
CPC .............. *G06N 3/08* (2013.01); *G05D 1/0088* (2013.01); *G05D 1/0212* (2013.01)

(58) Field of Classification Search
CPC .... G06K 9/00791; G06N 3/08; G05D 1/0088; G05D 1/0212; G06Q 50/30; G07C 5/008; A63F 13/00; A63F 13/217; A63F 13/26
USPC ........................................................ 382/159
See application file for complete search history.

(56) References Cited

U.S. PATENT DOCUMENTS

| | | | | |
|---|---|---|---|---|
| 10,460,600 | B2* | 10/2019 | Julian | G06K 9/6267 |
| 10,650,621 | B1* | 5/2020 | King | H04L 67/10 |
| 10,783,587 | B1* | 9/2020 | Augustine | G07C 5/0841 |
| 10,803,325 | B2* | 10/2020 | Bai | G06K 9/6232 |
| 10,823,572 | B2* | 11/2020 | Huang | G01C 21/20 |
| 10,883,844 | B2* | 1/2021 | Ogale | G06N 3/0454 |
| 10,928,819 | B2* | 2/2021 | Viswanathan | G05D 1/0077 |
| 11,061,402 | B2* | 7/2021 | Urtasun | G06K 9/00805 |
| 2009/0079830 | A1* | 3/2009 | Ekpar | H04N 21/4312 348/148 |
| 2010/0253492 | A1* | 10/2010 | Seder | H04N 7/18 340/435 |
| 2014/0277939 | A1* | 9/2014 | Ren | G01C 21/3638 701/36 |
| 2015/0112731 | A1* | 4/2015 | Binion | G06Q 40/08 705/4 |
| 2016/0236088 | A1* | 8/2016 | Li | A63F 13/655 |
| 2016/0314224 | A1* | 10/2016 | Wei | G06F 30/20 |
| 2018/0047295 | A1* | 2/2018 | Ricci | G05D 1/104 |
| 2018/0164825 | A1* | 6/2018 | Matus | G08G 1/096725 |
| 2018/0189574 | A1* | 7/2018 | Brueckner | G06K 9/00791 |
| 2018/0242190 | A1* | 8/2018 | Khoryaev | H04L 47/283 |
| 2018/0282955 | A1* | 10/2018 | McClendon | G08G 1/09623 |
| 2018/0284763 | A1* | 10/2018 | Hernandez Sanchez | G06Q 50/30 |
| 2019/0004538 | A1* | 1/2019 | Wood | G05D 1/0257 |
| 2019/0228240 | A1* | 7/2019 | Stamatopoulos | G08G 1/0129 |
| 2019/0318050 | A1* | 10/2019 | Zapolsky | G01M 17/007 |
| 2020/0065443 | A1* | 2/2020 | Liu | H04W 4/44 |
| 2020/0074747 | A1* | 3/2020 | Deng | G06T 3/0068 |
| 2020/0249674 | A1* | 8/2020 | Dally | G05D 1/0221 |
| 2021/0056713 | A1* | 2/2021 | Rangesh | G06K 9/6267 |
| 2021/0136572 | A1* | 5/2021 | Ingraham | H04W 12/069 |

OTHER PUBLICATIONS

European Search Report from the European Patent Office for corresponding EP Application No. 19162875.9 dated Sep. 2, 2019, 10 pages.

* cited by examiner

METHOD AND CONTROL UNIT FOR DETECTING A REGION OF INTEREST

CROSS-REFERENCES TO RELATED APPLICATIONS

This patent application claims priority to European Patent Application Serial No. 19162875.9 filed Mar. 14, 2019, which is incorporated herein by reference in its entirety.

TECHNICAL FIELD

The present document generally relates to a method and/or a control unit and/or a system for analyzing sensor data of an environment sensor of a vehicle. The method and/or the control unit and/or the system may determine a region of interest based on the sensor data from the environment sensor of the vehicle.

BACKGROUND

A conventional advanced driver assistance system for a vehicle may include an environment sensor. However, resolution of the environment sensor often exceeds processing power of the conventional system. In turn, this results in restricting sensing capabilities of the environment sensor. In the conventional system, the environment sensor may be a plurality of sensors. The conventional system may attempt to process all of the information captured by the plurality of sensors. Each sensor in the plurality of sensors may be treated equally. This may also result in a data overload condition, such that the information to be processed exceeds the processing capabilities of the conventional system. This may result in performance issues for the conventional system.

BRIEF SUMMARY OF THE INVENTION

According to an aspect, a system for a vehicle includes an environment sensor configured to capture environment sensor data regarding an environment of the vehicle. Furthermore, the system includes a control unit which is configured to determine a region of interest based on the environment sensor data and based on a machine-learned predictor. The machine-learned predictor may be configured to identify within the environment sensor data a region as the region of interest. The identified region being the region of interest may at least statistically coincide with a line of sight of an occupant, such as a human driver, of the vehicle. In addition, the control unit is configured to operate the vehicle or a component of the vehicle in dependence of the determined region of interest.

According to another aspect, a vehicle, such as a one-track or two track road vehicle, is described. For example, the vehicle may be a car, a bus, a truck or a motorcycle.

According to another aspect, an apparatus is configured to provide a machine-learned predictor. The machine-learned predictor is configured to indicate a region of interest within environment sensor data captured by an environment sensor of a vehicle. The apparatus is configured to determine training data comprising a plurality of training data sets. A training data set comprises environmental training data captured by an environment sensor of a vehicle at a particular time instant and a projection of a line of sight of an occupant, such as a human driver, of the vehicle, at the particular time instant, onto the environmental training data. In addition, the apparatus is configured to train the machine-learned predictor using the training data. The apparatus may provide the machine-learned predictor for use within a second vehicle.

According to another aspect, a method for operating a vehicle is described. The vehicle includes an environment sensor configured to capture environment sensor data regarding an environment of the vehicle. The method comprises capturing environment sensor data using the environment sensor. Furthermore, the method comprises determining a region of interest based on the environment sensor data and based on a machine-learned predictor. The machine-learned predictor is configured to identify within the environment sensor data a region as the region of interest. The identification of the region as the region of interest may at least statistically coincide with a line of sight of an occupant, such as a human driver, of the vehicle. In addition, the method comprises operating the vehicle in dependence of the determined region of interest.

According to a further aspect, a method for providing a machine-learned predictor configured to indicate a region of interest within environment sensor data captured by an environment sensor of a vehicle is described. The method includes determining training data comprising a plurality of training data sets. A training data set comprises environmental training data captured by an environment sensor of a vehicle at a particular time instant and a projection of a line of sight of an occupant, such as a human driver, of the vehicle, at the particular time instant, onto the environmental training data. In addition, the method comprises training the machine-learned predictor using the training data. The method may also provide the machine-learned predictor for use within a second vehicle.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION OF THE INVENTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
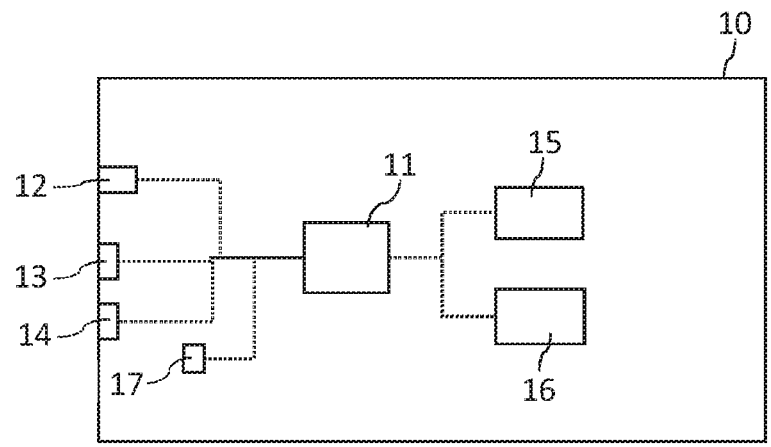
FIG. 1 generally illustrates components of a vehicle according to the principles of the present disclosure.

The present document is generally directed at increasing sensing capabilities of a vehicle, notably in order to improve performance of (advanced) driver assistance systems of the vehicle. In this context FIG. 1 shows example components of a vehicle 10. The vehicle comprises one or more environment sensors 12, 13, 14, which are configured to capture environment sensor data indicative of the environment of the vehicle 10. The environment may include the surroundings around the vehicle 10. In particular, the vehicle 10 may comprise a camera 12 configured to provide video or camera data, a radar sensor 13 configured to provide radar data and/or a lidar sensor 14 configured to provide lidar data. The camera 12, the radar sensor 13, and the lidar sensor 14 are examples of the one or more environment sensors 12, 13, 14.

A control unit 11 of the vehicle 10 may be configured to operate one or more actuators 15 of the vehicle 10 in dependence of the sensor data of the one or more environment sensors 12, 13, 14. Based on the environment sensor data, the control unit 11 may send a control signal to the one or more actuators 15. The control signal may cause the one or more actuators 15 to operate, such as to perform an action. The control signal may include command instructions to cause the one or more actuators 15 to operate, such as to perform the action. Example actuators 15 are a propulsion motor or engine, a braking system and/or a steering system of the vehicle 10. The actuators 15 may be configured to provide forward and/or sideways control of the vehicle 10. Hence, the control unit 11 may be configured to control the one or more actuators 15, in order to perform the forward and/or sideways control of the vehicle 10 at least partially in an autonomous manner (e.g. to provide an (advanced) driver assistance system).

The control unit 11 may include a processor and a memory. The processor may include any suitable processor, such as those described herein. The control unit 11 may include any suitable number of processors, such as one, two, three, four, or any suitable number of processors. The memory may include instructions that, when executed by the processor, cause the processor to, at least, perform the functions of the systems and methods described herein. The memory may comprise a single disk or a plurality of disks (e.g., hard drives), and includes a storage management module that manages one or more partitions within the memory. In some embodiments, memory may include flash memory, semiconductor (solid state) memory or the like. The memory may include Random Access Memory (RAM), a Read-Only Memory (ROM), or a combination thereof.

In particular, the control unit 11 may be configured to analyze the environment sensor data of the one or more environment sensors 12, 13, 14, in order to detect one or more objects within the environment of the vehicle 10. Furthermore, the one or more objects may be classified according to one of a plurality of different object classes or object types. Example object classes or types are: a moving object, e.g. a preceding or trailing vehicle traveling on a road within the environment of the vehicle 10, a cyclist traveling on a road, in a lane, within the environment of the vehicle 10, a pedestrian walking in a crosswalk within the environment of the vehicle 10, etc., or a static object, e.g. a building, a traffic sign etc. The moving object classification may include objects designed to freely move, even if currently at rest, such as a vehicle parked in a parking spot, a cyclist stopped at a stop sign, a pedestrian standing on a street corner, etc. The one or more actuators 15 may be controlled in dependence of the position and/or of the type or class of the detected one or more objects, e.g. in order to maintain a space cushion with the detected one or more objects.

Figure 2:
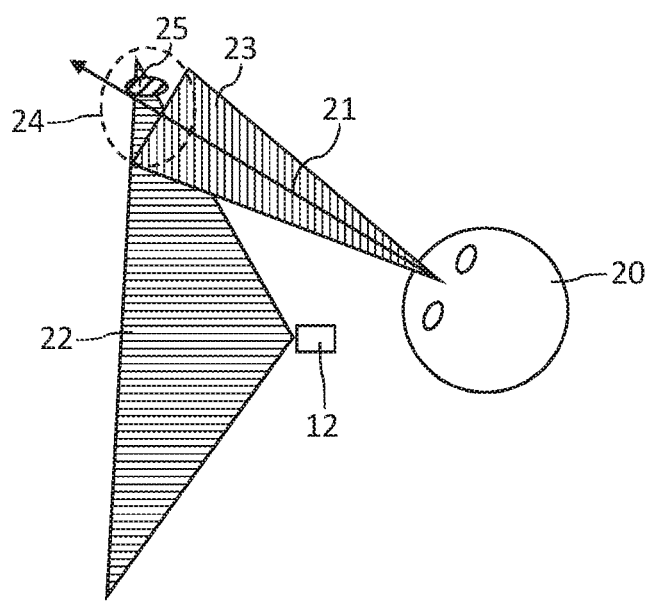
FIG. 2 generally illustrates a sensing situation within a vehicle according to the principles of the present disclosure.

The detection and the classification of an object based on environment sensor data is typically a processing intensive task. The sensor data may describe the environment of the vehicle 10 within a field of view 22 of the environment sensor 12, as illustrated in FIG. 2. By way of example, a camera 12 may be configured to capture camera data of a defined zone within the environment of the vehicle 10.

In order to reduce the processing cost, the object detection may be performed in two steps. In a first step, the environment sensor data may be analyzed (coarsely), in order to identify one or more regions of interest within the complete field of view 22 of the environment sensor 12. By way of example, a region proposal network may be used for this task. The one or more regions of interest may be the sub-areas within the field of view 22 of the environment sensor 12, which most likely contain an object.

In a second step, a region of interest may be analyzed in further detail, in order to verify whether the region of interest contains an object. Furthermore, the type or class of object contained within the region of interest may be determined. Object detection and/or classification within a confined region of interest may be performed in an efficient and reliable manner, e.g. using a trained neural network.

An experienced driver of a vehicle 10 is typically capable of focusing his or her senses on the most relevant information within the environment of the vehicle 10, such as to handle complex traffic situations. FIG. 2 illustrates an example driver 20, notably the head of a driver 20. When driving a vehicle 10, the driver 20 typically turns his or her line of sight 21 (and by consequence his or her field of view 23) towards the most relevant region 24 within the environment of the vehicle 10, e.g. in order to look at a particular object 25 within this particular region 24. Hence, the driver's line of sight 21 may be considered to be a reliable indicator of a relevant region 24 of interest within the environment of a vehicle 10.

The vehicle 10 may comprise a driver sensor 17, such as a driver camera, which is configured to capture driver sensor data with regards to the driver 20 of the vehicle 10. The driver sensor 17 may be arranged within the vehicle 10 to face the driver 20. In particular, the driver sensor 17 may be arranged to capture driver sensor data regarding the eyes of the driver 20. The control unit 11 may be configured to determine the line of sight 21 of the driver 20 based on the driver sensor data. It should be noted that such a driver sensor 17 is only required for capturing training data for training a machine-learned predictor 16. Hence, a high precision sensor 17 may be used. Subsequent to training the machine-learned predictor 16, the machine-learned predictor 16 may be used within a vehicle 10 that does not comprise a driver sensor 17.

The vehicle 10 may have access to the machine-learned predictor 16 (e.g. stored on a storage unit of the vehicle 10 and/or operated on the control unit 11 of the vehicle 10), wherein the machine-learned predictor 16 is configured to automatically determine one or more regions 24 of interest, based on the environment sensor data provided by one or more environment sensors 12, 13, 14 of the vehicle 10. The machine-learned predictor 16 may have been trained using training data which is indicative of the line of sights 21 of human drivers 20 during manual driving of the vehicle 10. In particular, the training data may comprise a plurality of training data sets, wherein a training data set indicates for a particular driving situation at a particular time instant, the environment sensor data captured by one or more environment sensors 12, 13, 14 of the vehicle 10; and the corresponding line of sight 21 of the driver 20 of the vehicle 10 and/or an indication which portion of the environment sensor data coincides with the line of sight 21 of the driver 20. In other words, a projection of the line of sight 21 of the driver 20 onto the environment sensor data may be indicated.

The line of sight 21 of the driver 20 may be viewed as the ground truth with regards to the most relevant region of interest 24 within the environment sensor data. The plurality of data sets of the training data may be determined based on the environment sensor data and the driver sensor data captured during manual driving of one or more vehicles 10 by one or more different drivers 20.

Figure 3:
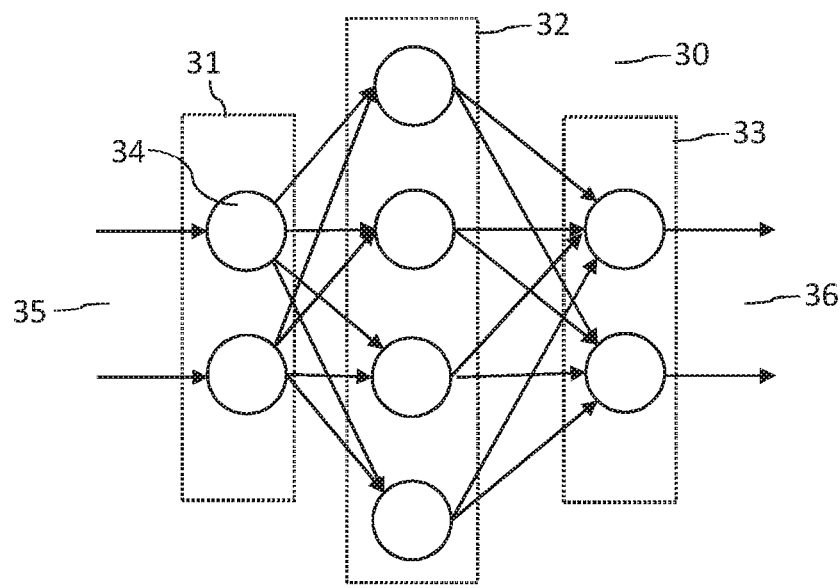
FIG. 3 generally illustrates a machine-learned predictor using a neural network according to the principles of the present disclosure.

The machine-learned predictor 16 may comprise an artificial neural network 30 that has been trained using the training data. FIG. 3 illustrates an example neural network 30 comprising an input layer 31, one or more hidden layers 32 and an output layer 33. Each of the layers 31, 32, 33 comprises one or more artificial neurons 34. A neuron 34 typically comprises one or more neuron parameters, such as a weight and/or an offset, as well as an activation function. The neuron parameters of a neural network 30 may be trained using a training algorithm, such as the backpropagation algorithm.

The neural network 30 may receive as input an input vector 35 which is indicative of the environment sensor data describing a particular traffic situation within the environment of a vehicle 10. On the other hand, the neural network 30 may provide as an output an output vector 36 which is indicative of at least one or exactly one region of interest 24 within the corresponding environment sensor data.

The neural network 30 may be trained using the plurality of training data sets. The neural network 30 may be trained by setting the neuron parameters of the neural network 30 such that in average for each of the plurality of training data sets, a deviation of the predicted region of interest 24 from the region of interest 24 indicated by the training data set is reduced, notably minimized. The predicted region of interest 24 may correspond to the region of interest which is provided as output vector 36 of the neural network 30 when providing as input vector 35 the environment sensor data of a training data set. As indicated above, an iterative training algorithm, such as the backpropagation algorithm, may be used to achieve this goal.

Hence, a method for detecting regions of interests 24 is described. The method learns from an occupant of a vehicle, such as human driver, to identify the information within environment sensor data that is relevant within a particular driving situation. The method is configured to automatically identify one or more regions of interest 24, e.g. based on a camera image of the vehicle camera 12.

In order to collect training data, an eye-tracking system 17 may be used on test drivers 20 (in order to detect the driver's line of sight 21) while collecting environment sensor data, such as from front facing camera images of the vehicle camera 12. The eye-tracking information as well as the corresponding sensor information may be collected as training data sets. For this purpose, capturing of the driver sensor data (for eye-tracking) and capturing of the environment sensor data should be time synchronized.

The eye-tracking information (e.g. the line of sight 21 of the driver 20) may be projected into a corresponding image of the front facing camera system 12. For this purpose, calibration parameters (i.e. pose data) of the camera 12 and of the eye-tracking system 17 may be used. Furthermore, 3D information regarding the environment based on visual odometry, lidar (light detection and ranging), etc., may be used. Hence, a plurality of training data sets may be provided, wherein a training data set indicates as input the sensor data captured by the environment sensor 12 (e.g. the front facing camera system) and indicates as output or label the information from the eye-tracking system 17 projected into the camera image (i.e. the region of interest 24 within the camera image, which corresponds to the line of sight 21 of the driver 20). The training of the neural network 30 (i.e. of the machine-learned predictor 16) using the training data may be performed offline.

During operation of a vehicle 10, the machine-learned predictor 16 comprising the neural network 30 may be used as follows: A current camera image captured by the camera 12 may be provided as input. The machine-learned predictor 16 may then provide as an output the region of interest 24 within this camera image. In particular, the machine-learned predictor 16 may indicate the region 24 within the camera image that a human driver 20 would have looked at (statistically, e.g. in average or in more than 50% of the cases).

The region of interest 24 which is provided by the machine-learned predictor 16 may be further processed by a subsequent detection system or algorithm, in order to detect an object 25 within the region of interest 24. The detection system or algorithm may comprise a convolutional neural network (CNN) and/or a microcontroller leveraging techniques such as HOGs (histogram of oriented gradients), or algorithms and/or techniques from OpenCV (Open Source Computer Vision Library), etc. Hence, a two step-approach for detecting an object 25 may be used, wherein in a first step, a relevant region of interest 24 is determined, and wherein in a second step, an object 25 is detected and/or classified within the relevant region of interest 24.

The machine-learned predictor 16 and/or neural network 30 for detecting relevant regions of interest 24 may be used as input for other types of environment sensors 13, 14, such as a radar sensor 13 and/or a lidar sensor 14. In particular, the control unit 11 may be configured to operate a radar sensor 13 and/or a lidar sensor 14 in a focused manner, based on a relevant region of interest 24. In particular, the radar sensor 13 and/or the lidar sensor 14 may be instructed to capture environment sensor data only within the relevant region of interest 24 or with an increased resolution within the relevant region of interest 24. By doing this, the sensing capability of the vehicle 10 may be further increased.

The machine-learned predictor 16, notably the neural network 30, may be trained for one or more different types of environment sensors 12, 13, 14 (alone or in combination). The line of sight 21 of a human driver 20, which is provided by the driver sensor 17, may be projected onto the environment sensor data of a camera 12, of a radar sensor 13 and/or of a lidar sensor 14, thereby providing labeled training data from a camera 12, from a radar sensor 13 and/or from a lidar sensor 14. The labeled training data for the different types of environment sensors 12, 13, 14 may be used to train separate machine-learned predictors 16, notably separate neural networks 30, for the different types of environment sensors 12, 13, 14. Alternatively, or in addition, a combined machine-learned predictor 16, notably a combined neural network 30, may be trained using as input a combination of the environment sensor data from (possibly all) different types of environment sensors 12, 13, 14. By making use of different types of environment sensors 12, 13, 14 the sensing capability of a vehicle 10 may be further increased.

As indicated above, the region of interest 24 provided by a machine-learned predictor 16 may be used for a perception task. Alternatively, or in addition, the region of interest 24 may be used as a basis for functional decision making within the vehicle 10, e.g. as a basis for making a functional decision within a driver assistance system. By way of example, the region of interest 24 may be used to decide on whether or not an overtaking maneuver is initiated. As an example, the overtaking maneuver may be used when the vehicle 10 is a trailing vehicle. As the trailing vehicle, the vehicle 10 may be directly behind a preceding vehicle. Through the overtaking maneuver, the vehicle 10 may change lanes and accelerate to pass the preceding vehicle. From there, the vehicle 10 may change lanes again, such that the vehicle 10 is now the preceding vehicle directly in front of what was previously the preceding vehicle.

Alternatively, or in addition, the region of interest 24 provided by a machine-learned predictor 16 may be used directly as a model element or model object within an environment model used by the vehicle 10.

Alternatively, or in addition, the behavioral decision making of the vehicle 10 may directly take into account the region of interest 24 provided by a machine-learned predictor 16. By way of example, the vehicle speed may be adapted automatically depending on the location of the region of interest 24. In another example, the region of interest 24 may be used for path planning of the vehicle's path.

Hence, a method is described which learns regions of interests 24 for (possibly fully or partially autonomous) vehicles 10 by training a neural network 30 which uses eye-tracking information as ground truth, i.e. for labeling training data, in conjunction with sensor data from a camera 12 and/or a radar sensor 13 and/or a lidar sensor 14. It should be noted that no manual labeling is necessary for providing the training data, as the labels for the environment sensor data are collected in an automatic manner during test drives.

The trained neural network 30 may be used for object detection during operation of a vehicle 10. Alternatively, or in addition, the trained neural network 30 may be used for focusing the sensing of environment sensors 12, 13, 14 such as cameras 12, lidar sensors 14 or radar sensors 13. The regions of interest 24 provided by the trained neural network 30 may be integrated within an environmental model of the vehicle 10 (e.g. for path planning of the vehicle 10).

Alternatively, or in addition, the regions of interest 24 provided by the trained neural network 30 may be used for determining a complexity measure indicative of the complexity of a driving situation. In particular, a sequence of regions of interest 24 may be determined for a corresponding sequence of time instants, wherein the sequence of regions of interest 24 is determined based on a corresponding sequence of environment sensor data captured at the corresponding sequence of time instants. The sequence of regions of interest 24 may be analyzed. In particular, a spatial and/or temporal distribution of the sequence of regions of interest 24 may be determined. A relatively fast change of the regions of interest 24 may indicate a relatively complex driving situation (as the eye of the driver 20 which is modelled by the neural network 30 jumps rapidly between different regions of interest 24).

Figure 4:
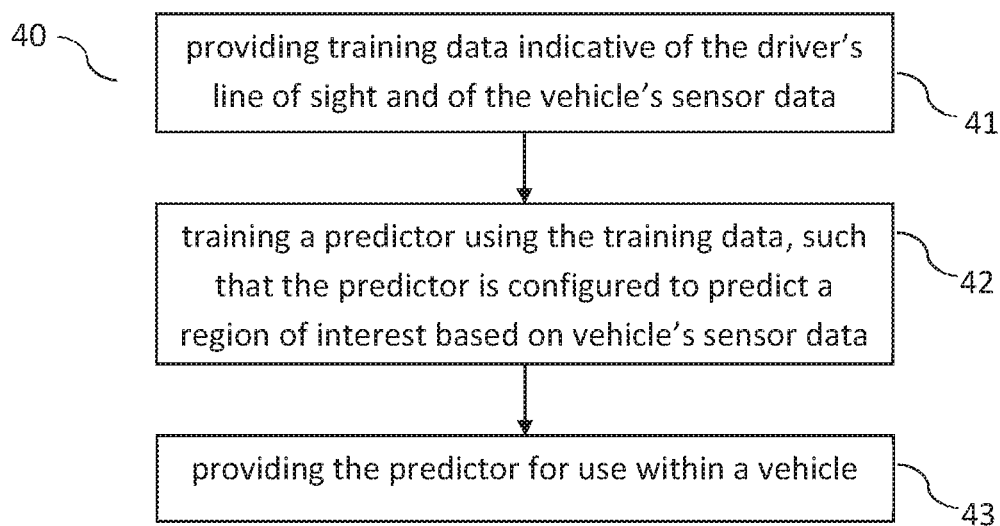
FIG. 4 generally illustrates a flow chart of a method for providing a machine-learned predictor according to the principles of the present disclosure.

FIG. 4 shows a flow chart of an example method 40 for providing a machine-learned predictor 16 configured to indicate a region of interest 24 within environment sensor data captured by an environment sensor 12, 13, 14 of a vehicle 10. The method 40 may be executed by an apparatus (e.g. by a server or a computer). The method 40 may be executed offline. On the other hand, the method 40 may be executed online within a vehicle 10 (e.g. during a training phase). In particular, the method 40 may be used to adapt a vehicle 10 to the viewing habits of an occupant, notably a driver, of a particular vehicle. By doing this, the behavior of the vehicle 10 may be adapted to the particular driver 20.

The method 40 comprises determining 41 training data comprising a plurality of training data sets. A training data set (notably each training data set) may comprise environmental training data captured by an environment sensor 12, 13, 14 of a vehicle 10 at a particular time instant. Furthermore, the training data set may comprise (as a label) a projection of a line of sight 21 of a human driver 20 of the vehicle 10 at the particular time instant onto the environmental training data. In particular, the training data set may indicate as a label which area of the environmental training data the driver 20 looked at, at the particular time instant.

The method 40 may comprise (for determining a training data set) capturing environment sensor data using the environment sensor 12, 13, 14 of a vehicle 10 at the particular time instant. Furthermore, driver sensor data regarding the driver 20 of the vehicle 10 may be captured at the particular time instant, using a driver sensor 17 (e.g. a camera) of the vehicle 10. The line of sight 21 of the driver 20 at the particular time instant may then be determined based on the driver sensor data. Furthermore, a training data set may be determined based on the environment sensor data at the particular time instant and based on the line of sight 21 of the driver 20 at the particular time instant.

Furthermore, the method 40 may comprise determining pose data regarding a pose of the environment sensor 12, 14, 16 and a pose of the driver sensor 17. In particular, a geometrical relationship between the pose of the environment sensor 12, 14, 16 and the pose of the driver sensor 17 may be determined. A projection of the line of sight 21 of the driver 20 at the particular time instant onto the environment sensor data at the particular time instant may then be determined based on the pose data.

Hence, training data sets for training a machine-learned projector 16 may be provided in an efficient manner during manual driving activity of one or more drivers 20.

Furthermore, the method 40 comprises training 42 the machine-learned predictor 16 using the training data. The machine-learned predictor 16 may be trained such that the machine-learned predictor 16 is configured to identify within environment sensor data of an environment sensor 12, 13, 14 of a vehicle 10 a region as a region of interest 24 that at least statistically coincides with the line of sight 21 of the human driver 20.

The line of sight 21 of human drivers 20 within a particular driving situation (which is represented by the environment sensor data) may be distributed according to a particular probability distribution (e.g. a normal distribution with a particular variance around a mean or expectation value). The probability distribution of the line of sight 21 may (implicitly) be represented by the training data. The machine-learned predictor 16 may be trained such that the region which is provided and/or identified by the machine-learned predictor 16 corresponds (with an inaccuracy of ±10% or less) to the expectation or mean value of the probability distribution of the line of sight 21 of human drivers 20 within the particular driving situation (which is represented by the environment sensor data). Alternatively, or in addition, the machine-learned predictor 16 may be trained such that the region which is provided and/or identified by the machine-learned predictor 16 corresponds to the line of sight 21 of human drivers 20 in 40% or more, 50% or more, or 60% or more of the cases.

The machine-learned predictor 16 may comprise an artificial neural network 30 comprising a plurality of artificial neurons 34 arranged in multiple layers 31, 32, 33. Training 42 the machine-learned predictor 16 may comprise determining neuron parameters of the plurality of neurons 34 of the neural network 30 using the training data. For this purpose, a training algorithm, such as the backpropagation algorithm, may be used.

As a result of this, a machine-learned predictor 16 of the line of sight 24 of a human driver 20 may be provided, wherein the machine-learned predictor 16 (at least statistically and/or in average) mimics the behavior of one or more human drivers 20 (the behavior of the one or more human drivers 20 being reflected within the training data). The machine-learned predictor 16 may be provided 43 for use within the vehicle 10, thereby increasing the sensing capabilities of the vehicle 10. The machine-learned predictor 16 may be provided for use within one or more other vehicles.

The environment sensor 12, 13, 14 of the vehicle 10 may comprise one or more of: the camera 12, the radar sensor 13 and/or the lidar sensor 14. For each of the different types of environment sensors 12, 13, 14, a sensor-type specific, machine-learned predictor 16 may be trained and provided. Alternatively, or in addition, a machine-learned predictor 16 may be provided which makes use of the environment sensor data of multiple types of environment sensors 12, 13, 14 for predicting a region of interest 24. Overall, the use of multiple types of environment sensors 12, 13, 14 for detecting a region of interest 24 further increases the sensing capabilities of a vehicle 10.

Figure 5:
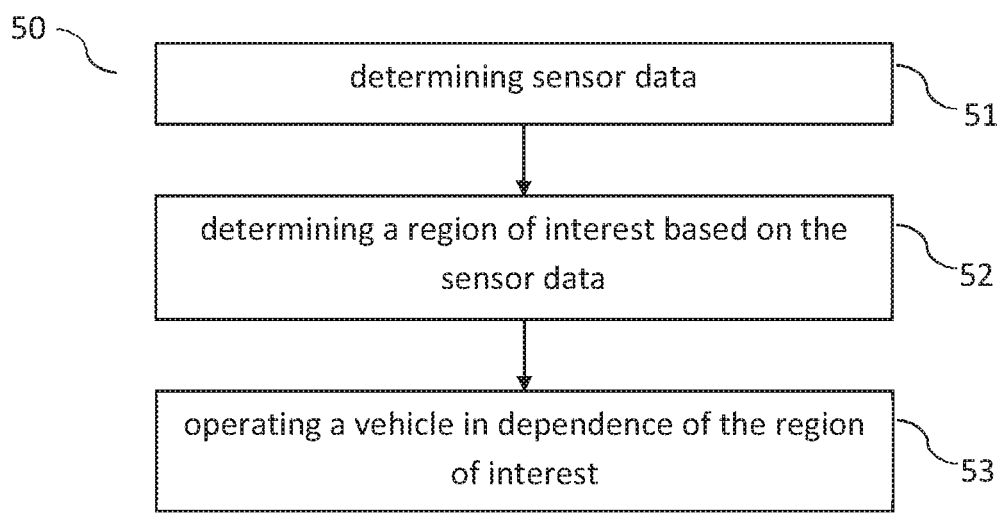
FIG. 5 generally illustrates a flow chart of a method for determining a region of interest based on sensor data according to the principles of the present disclosure.

FIG. 5 shows a flow chart of an example method 50 for operating a vehicle 10. The method 50 may be executed by a control unit 11 of the vehicle 10. The vehicle 10 comprises an environment sensor 12, 13, 14 configured to capture environment sensor data regarding an environment of the vehicle 10. Example environment sensors 12, 13, 14 are a camera 12, a radar sensor 13 and/or a lidar sensor 14.

The method 50 may be executed repeatedly at a sequent of time instants. The method 50 comprises, at a given time instant, determining 51 environment sensor data for the given time instant. The environment sensor data may describe a particular area of the environment of the vehicle 10 at the given time instant.

Furthermore, the method comprises determining 52 a region of interest 24 based on the environment sensor data and based on a machine-learned predictor 16. The machine-learned predictor 16 may have been designed and/or trained using the method 40 described herein. In particular, the machine-learned predictor 16 may be configured to identify within the environment sensor data a region as the region of interest 24 that at least statistically and/or in average coincides with a line of sight 21 of an occupant, notably a human driver 20, of the vehicle 10. In other words, the machine-learned predictor 16 may indicate which sub-region within the environment sensor data a human driver 20 would (at least statistically and/or in average) look at. In particular, the indicated sub-region may correspond to the expectation value of the line of sight 21 of human drivers 20.

As outlined above, the machine-learned predictor 16 may comprise or may be an artificial neural network 30, notably a convolutional neural network. The machine-learned predictor 16 may have been trained using training data comprising a plurality of training data sets captured during manual driving performed by a human driver 20. A training data set (notably each training data set) of the training data may comprise environmental training data captured at a particular time instant and a projection of the line of sight 21 of the human driver 20 at the particular time instant onto the environmental training data.

Furthermore, the method 50 may comprise operating 53 the vehicle 10 in dependence of the determined region of interest 24. As a result of this, analysis of the environment sensor data may be focused on the determined region of interest 24, thereby increasing the sensing capability of a vehicle 10 in an efficient and reliable manner.

The method 50 may comprise determining a corresponding sequence of environment sensor data for a sequence of time instants. Furthermore, a corresponding sequence of regions of interest 24 may be determined based on the sequence of environment sensor data and based on the machine-learned predictor 16. By doing this, the most relevant region of interest 24 may be updated in a continuous manner for continuous operation of the vehicle 10.

In particular, the method 50 may comprise determining a complexity measure indicative of the complexity of a driving situation (which occurs at the sequence of time instants), based on the sequence of regions of interest 24, notably based on a spatial and/or temporal distribution of the sequence of regions of interest 24. The vehicle 10 may then be operated in dependence of the complexity measure. In particular, a handover from autonomous driving to manual driving may be initiated in dependence of (a value of) the complexity measure, thereby increasing the comfort and safety of a vehicle 10.

The method 50 may comprise detecting and/or classifying an object 25 within the determined region of interest 24 using an object detection algorithm. The vehicle 10 may then be operated in a reliable manner in dependence of the position and/or the type of the detected object 25.

The vehicle 10 may comprise a first environment sensor 12 (e.g. of a first type) configured to capture first environment data regarding a particular area of the environment of the vehicle 10 and a second environment sensor 14 (e.g. of a different second type) configured to capture second environment data regarding the particular area of the environment of the vehicle 10.

The method 50 may comprise determining the region of interest 24 based on the first environment data. Furthermore, the method 50 may comprise controlling the second environment sensor 14 in dependence of the determined region of interest 24, notably in order to selectively increase the resolution of the second environment sensor 14 within the determined region of interest 24 and/or in order to limit capturing of second environment data to the determined region of interest 24. Hence, the determined region of interest 24 may be used for focusing the operation of a different environment sensor 14, thereby further increasing the sensing capabilities of a vehicle 10.

The determined region of interest 24 may be used directly as an additional virtual object within an environmental model of the vehicle 10. Alternatively, or in addition, path planning of a path of the vehicle 10 may be performed (directly) in dependence of the determined region of interest 24. Alternatively, or in addition, a driving parameter of the vehicle 10, notably a driving speed of the vehicle 10, may be adapted (directly) in dependence of the determined region of interest 24. Alternatively, or in addition, an advanced driver assistance system of the vehicle 10 may be provided and/or operated in dependence of the determined region of interest 24. Hence, the comfort and security of a vehicle 10 may be improved.

As indicated above, the vehicle 10 may comprise a first environment sensor 12 of a first type, configured to capture first environment data regarding the environment of the vehicle 10, and a second environment sensor 14 of a second type, configured to capture second environment data regarding the environment of the vehicle 10. The method 50 may comprise determining first environment sensor data using the first environment sensor 12 and determining second environment sensor data using the second environment sensor 14.

Furthermore, the method 50 may comprise determining a first region of interest 24 based on the first environment sensor data and based on a first machine-learned predictor 16, wherein the first machine-learned predictor 16 is configured to identify within the first environment sensor data a region as the first region of interest 24 that at least statistically and/or in average coincides with a line of sight 21 of a human driver 20. In addition, the method 50 may comprise determining a second region of interest 24 based on the second environment sensor data and based on a second machine-learned predictor 16, wherein the second machine-learned predictor 16 is configured to identify within the second environment sensor data a region as the second region of interest 24 that at least statistically and/or in average coincides with a line of sight 21 of human drivers 20.

Hence, different machine-learned predictors 16 may be provided for different types of environment sensors 12, 14. The vehicle 10 may then be operated in dependence of the determined first and second region of interest 24, thereby increasing the comfort and/or security of a vehicle 10.

Alternatively, or in addition, the method 50 may comprise determining a region of interest 24 based on the first environment sensor data, the second environment data and based on the machine-learned predictor 16, wherein the machine-learned predictor 16 is configured to identify within the first and the second environment sensor data a region as the region of interest 24 that at least statistically and/or in average coincides with a line of sight 21 of human drivers 20. Hence, a machine-learned predictor 16 may be provided which is configured to predict a region of interest 24 based on the sensor data of multiple types of environment sensors 12, 13, 14, thereby further increasing the sensing capability of a vehicle 10.

The schemes outlined in the present document enable a vehicle 10 to identify relevant regions of interest 24 in an efficient and reliable manner. This may be achieved by making use of the experience and/or of the viewing behaviors of human drivers 20. Furthermore, the complexity of a traffic situation may be analyzed in an efficient and reliable manner. This information may e.g. be used for triggering a handover from autonomous driving to manual driving.

In some embodiments, a system for a vehicle includes an environment sensor configured to capture environment sensor data corresponding an environment of the vehicle. The system also includes a control unit coupled to the environment sensor and configured to, at a predetermined time: determine a region of interest based on the environment sensor data and a machine-learned predictor, wherein the machine-learned predictor is configured to identify, within the environment sensor data, a region as the region of interest that at least statistically coincides with a line of sight of an occupant of the vehicle; and operate the vehicle in based on the determined region of interest.

In some embodiments, the control unit is configured to: determine a corresponding sequence of environment sensor data for a sequence of time instants; determine a corresponding sequence of regions of interest based on the sequence of environment sensor data and the machine-learned predictor; determine a complexity measure indicative of a complexity of a driving situation at the sequence of time instants based on the sequence of regions of interest; and operate the vehicle in response to the complexity measure. In some embodiments, the control unit is configured to: classify an object within the determined region of interest using an object detection algorithm; and operate the vehicle in based on the object. In some embodiments, the vehicle includes a first environment sensor configured to capture first environment data corresponding to a particular area of the environment of the vehicle and a second environment sensor configured to capture second environment data corresponding to the particular area of the environment of the vehicle. In some embodiments, the control unit is configured to: determine the region of interest based on the first environment data; and control the second environment sensor based on the determined region of interest in order to selectively increase a resolution of the second environment sensor within the determined region of interest or in order to limit capturing of second environment data to the determined region of interest.

In some embodiments, the control unit is configured to directly use the determined region of interest as a virtual object within an environmental model of the vehicle. In some embodiments, the control unit is configured to perform path planning of a path of the vehicle based on the determined region of interest. In some embodiments, the control unit is configured to adapt a driving parameter of the vehicle based on the determined region of interest. In some embodiments, the control unit is configured to provide an advanced driver assistance system of the vehicle based on the determined region of interest.

In some embodiments, a system for a vehicle includes a processor and a memory. The method includes instructions that, when executed by the processor, cause the processor to: determine a region of interest based on environment sensor data corresponding an environment of the vehicle and a machine-learned predictor configured to identify, within the environment sensor data, a region as the region of interest that at least statistically coincides with a line of sight of an occupant of the vehicle; classify a detected object within the determined region of interest using an object detection algorithm; and operate the vehicle in based on at least one of the detected object and the determined region of interest.

In some embodiments, the instructions further cause the processor to: determine a corresponding sequence of environment sensor data for a sequence of times; determine a corresponding sequence of regions of interest based on the sequence of environment sensor data and the machine-learned predictor; determine a complexity measure indicative of a complexity of a driving situation at the sequence of time instants based on the sequence of regions of interest; and operate the vehicle in response to the complexity measure.

In some embodiments, the instructions further cause the processor to use the determined region of interest as a virtual object within an environmental model of the vehicle. In some embodiments, the instructions further cause the processor to perform path planning of a path of the vehicle in dependence of the determined region of interest. In some embodiments, the instructions further cause the processor to adapt a driving parameter of the vehicle based on the determined region of interest. In some embodiments, the instructions further cause the processor to provide an advanced driver assistance system of the vehicle based on the determined region of interest.

In some embodiments, a method for a vehicle includes determining a region of interest based on environment sensor data corresponding an environment of the vehicle and a machine-learned predictor configured to identify, within the environment sensor data, a region as the region of interest that at least statistically coincides with a line of sight of an occupant of the vehicle. The method also includes classifying a detected object within the determined region of interest using an object detection algorithm. The method also includes operating the vehicle in based on at least one of the detected object and the determined region of interest.

In some embodiments, the method also includes determining a corresponding sequence of environment sensor data for a sequence of times. The method also includes determining a corresponding sequence of regions of interest based on the sequence of environment sensor data and the machine-learned predictor. The method also includes determining a complexity measure indicative of a complexity of a driving situation at the sequence of time instants based on the sequence of regions of interest. The method also includes operating the vehicle in response to the complexity measure. In some embodiments, the method also includes using the determined region of interest as a virtual object within an environmental model of the vehicle. In some embodiments, the method also includes performing path planning of a path of the vehicle in dependence of the determined region of interest. In some embodiments, the method also includes adapting a driving parameter of the vehicle based on the determined region of interest.

The features described in herein can be relevant to one or more embodiments in any combination. The reference numerals in the claims have merely been introduced to facilitate reading of the claims. They are by no means meant to be limiting.

Throughout this specification various embodiments have been discussed. However, it should be understood that the invention is not limited to any one of these. It is therefore intended that the foregoing detailed description be regarded as illustrative rather than limiting.

The above discussion is meant to be illustrative of the principles and various embodiments of the present disclosure. Numerous variations and modifications will become apparent to those skilled in the art once the above disclosure is fully appreciated.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. The term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available

Having thus described the invention, it is claimed:

1. A system for a vehicle, the system comprising:
   an environment sensor configured to capture environment sensor data corresponding an environment of the vehicle; and
   a control unit coupled to the environment sensor and configured to, at a predetermined time:
     determine a region of interest based on the environment sensor data and a machine-learned predictor, wherein the machine-learned predictor is configured to identify, within the environment sensor data, a region as the region of interest that at least statistically coincides with a line of sight of an occupant of the vehicle;
     determine a corresponding sequence of environment sensor data for a sequence of time instants;
     determine a corresponding sequence of regions of interest based on the sequence of environment sensor data and the machine-learned predictor;
     determine a complexity measure indicative of a complexity of a driving situation at the sequence of time instants based on the sequence of regions of interest; and
     operate the vehicle in response to the complexity measure based on the determined region of interest.

2. The system of claim 1, wherein the control unit is configured to:
   classify an object within the determined region of interest using an object detection algorithm; and
   operate the vehicle in based on the object.

3. The system of claim 1, wherein the vehicle includes a first environment sensor configured to capture first environment data corresponding to a particular area of the environment of the vehicle and a second environment sensor configured to capture second environment data corresponding to the particular area of the environment of the vehicle.

4. The system of claim 3, wherein the control unit is configured to:
   determine the region of interest based on the first environment data; and
   control the second environment sensor based on the determined region of interest in order to selectively increase a resolution of the second environment sensor within the determined region of interest or in order to limit capturing of second environment data to the determined region of interest.

5. The system of claim 1, wherein the control unit is configured to directly use the determined region of interest as a virtual object within an environmental model of the vehicle.

6. The system of claim 1, wherein the control unit is configured to perform path planning of a path of the vehicle based on the determined region of interest.

7. The system of claim 1, wherein the control unit is configured to adapt a driving parameter of the vehicle based on the determined region of interest.

8. The system of claim 1, wherein the control unit is configured to provide an advanced driver assistance system of the vehicle based on the determined region of interest.

9. A system for a vehicle, the system comprising:
   a processor; and
   a memory including instructions that, when executed by the processor, cause the processor to:
      determine a region of interest based on environment sensor data corresponding an environment of the vehicle and a machine-learned predictor configured to identify, within the environment sensor data, a region as the region of interest that at least statistically coincides with a line of sight of an occupant of the vehicle;
      classify a detected object within the determined region of interest using an object detection algorithm;
      determine a corresponding sequence of environment sensor data for a sequence of times;
      determine a corresponding sequence of regions of interest based on the sequence of environment sensor data and the machine-learned predictor;
      determine a complexity measure indicative of a complexity of a driving situation at the sequence of time instants based on the sequence of regions of interest; and
      operate the vehicle in response to the complexity measure based on at least one of the detected object and the determined region of interest.

10. The system of claim 9, wherein the instructions further cause the processor to use the determined region of interest as a virtual object within an environmental model of the vehicle.

11. The system of claim 9, wherein the instructions further cause the processor to perform path planning of a path of the vehicle in dependence of the determined region of interest.

12. The system of claim 9, wherein the instructions further cause the processor to adapt a driving parameter of the vehicle based on the determined region of interest.

13. The system of claim 9, wherein the instructions further cause the processor to provide an advanced driver assistance system of the vehicle based on the determined region of interest.

14. A method for a vehicle, the method comprising:
   determining a region of interest based on environment sensor data corresponding an environment of the vehicle and a machine-learned predictor configured to identify, within the environment sensor data, a region as the region of interest that at least statistically coincides with a line of sight of an occupant of the vehicle;
   classifying a detected object within the determined region of interest using an object detection algorithm;
   determining a corresponding sequence of environment sensor data for a sequence of times;
   determining a corresponding sequence of regions of interest based on the sequence of environment sensor data and the machine-learned predictor;
   determining a complexity measure indicative of a complexity of a driving situation at the sequence of time instants based on the sequence of regions of interest; and
   operating the vehicle in response to the complexity measure based on at least one of the detected object and the determined region of interest.

15. The method of claim 14, further comprising using the determined region of interest as a virtual object within an environmental model of the vehicle.

16. The method of claim 14, further comprising performing path planning of a path of the vehicle in dependence of the determined region of interest.

17. The method of claim 14, further comprising adapting a driving parameter of the vehicle based on the determined region of interest.

* * * * *